United States Patent [19]

Sugitani et al.

[11] Patent Number: 4,570,167

[45] Date of Patent: Feb. 11, 1986

[54] INK JET RECORDING HEAD

[75] Inventors: Hiroshi Sugitani, Machida; Susumu Ito, Hiratsuka; Junichi Kobayashi, Ebina, all of Japan

[73] Assignee: Canon Kabushiki Kaisha, Tokyo, Japan

[21] Appl. No.: 600,328

[22] Filed: Apr. 13, 1984

[30] Foreign Application Priority Data

Apr. 19, 1983 [JP] Japan .................................. 58-67720

[51] Int. Cl.⁴ .............................................. G01D 15/18

[52] U.S. Cl. .................................... 346/140 R; 346/75

[58] Field of Search .................. 346/75, 140 R, 76 PH

[56] References Cited

U.S. PATENT DOCUMENTS 4,334,234 6/1982 Shirato et al. .................. 346/140 R 4,338,610 7/1982 Sellen et al. .......................... 346/75

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

In an ink jet head comprising an orifice provided on a substrate for discharging an ink to form flying droplets, an ink channel provided on the substrate and communicating with the orifice, energy generating elements provided on the substrate for generating energy to be applied for discharging the droplets, and an intermediate ink chamber provided on the substrate for holding the ink to be supplied to the ink channel, the ink jet recording head has positioning guides for aligning side and rear wall members constituting the intermediate ink chamber at predetermined positions on the substrate, respectively.

6 Claims, 7 Drawing Figures

INK JET RECORDING HEAD

BACKGROUND OF THE INVENTION

1. Field of the Invention

The present invention relates to an ink jet recording head and, more particularly, to an ink jet recording head used in an ink jet recording system for forming flying ink droplets.

2. Description of the Prior Art

An ink jet recording head applied to an ink jet recording system comprises small discharging ports (orifices), ink channels, an intermediate liquid chamber for storing the ink and an energy generating portion provided in a part of each of the ink channels.

A method of forming an ink channel which comprises the steps of forming small grooves on a glass or metal plate by cutting or etching and thereafter bonding the plate to another plate, is a known a method of making such an ink jet recording head.

However, in the head formed by the conventional method described above, an inner wall of the ink channel of the head may be excessively roughened, or the ink channel of the head may be distorted due to an etching rate variation. Therefore, it is difficult to form the ink channel high precision, and the resultant ink jet recording head tends to produce variations in the ink discharge characteristics. Further, cracks and damage tend to occur in the plate during cutting, thereby decreasing the yield of ink jet recording heads. In particular, when etching is performed, the many manufacturing steps increase the manufacturing cost, resulting in inconvenience. In addition to this disadvantage, a common drawback of the conventional methods lies in the fact that it is difficult to properly align a grooved plate having a groove for an ink channel with a cover plate having active elements such as heater elements and piezoelectric elements for generating energy to be applied to the ink. As a result, mass production cannot be effectively performed.

In order to overcome these problems, a method of manufacturing an ink jet recording head is disclosed in German Laid-open Patent Application DOLS No. 3108206. (corresponding to Japanese Patent Application Laid-Open No. 57-43876) wherein an ink channel wall made of a hardened film of photo-sensitive resin is formed on a substrate having energy generating elements disposed thereon, and thereafter a cover is disposed to cover the ink channel.

The ink jet recording head having the ink channel wall of the photo-sensitive resin film has advantages in that the ink channel surfaces are smoothed to a high precision, the manufacturing steps become simplified, and the product yield is increased.

However, in this ink jet recording head, it is difficult to align the components of the ink jet recording head therebetween, especially members constituting an intermediate ink chamber for supplying an ink to an orifice through the ink channel. This alignment work requires great skill. In addition to this disadvantage, when the substrate and the constituent members of the ink jet recording head are bonded together, an adhesive flows in the ink jet channel, which then becomes clogged. The obviation of these problems is required because an ink jet recording head with high density multi-orifices and uniformly high performance capable of recording the high resolusion images is recently required.

SUMMARY OF THE INVENTION

It is an object of the present invention to overcome the conventional drawbacks described above and to provide an ink jet recording head wherein constituent members of the ink jet recording head, especially the constituent members of an intermediate liquid chamber thereof, can be easily aligned, and the manufacturing process is simplified to produce high-quality, highly-reliable ink jet recording heads on a mass production line at a high yield.

It is another object of the present invention to provide an ink jet recording head comprising on a substrate, orifices for discharging an ink to form flying droplets, an ink channel or ink supply area communicating with the orifices, energy generating elements for generating energy to be applied upon to discharge the droplets, and an intermediate liquid chamber or ink tank for storing the ink to be supplied to the ink channel, wherein the ink jet recording head has positioning guides for aligning side and rear wall members constituting the intermediate liquid chamber at predetermined positions on the substrate, respectively.

DETAILED DESCRIPTION OF THE PREFERRED EMBODIMENT

A preferred embodiment of the present invention will be described in detail, FIGS. 1 to 7 are perspective views for explanation of the steps in manufacturing the ink jet recording head according to the embodiment of the present invention.

Figure 1:
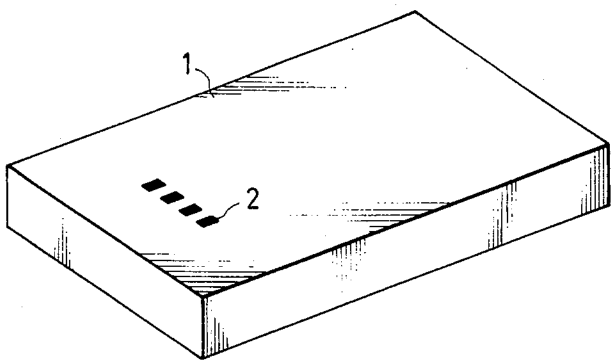
FIGS. 1 to 7 are perspective views showing the steps in manufacturing an ink jet recording head according to an embodiment of the present invention.

As shown in FIG. 1, energy generating elements 2 (four elements in FIG. 1) such as heating elements or piezoelectric elements are disposed on an adequate substrate 1 made of glass, ceramic, plastic or metal. An inorganic oxide or nitride material is deposited to cover the entire surface for providing a high insulation characteristic and high resistivity to inks. In addition, a precious metal, an anticorrosive metal or an anticorrosive alloy may be deposited on the entire surface for improving resistivity to inks. These protective layers are not illustrated in FIG. 1. Signal input electrodes (not shown) are connected to the energy generating elements.

Figure 2:
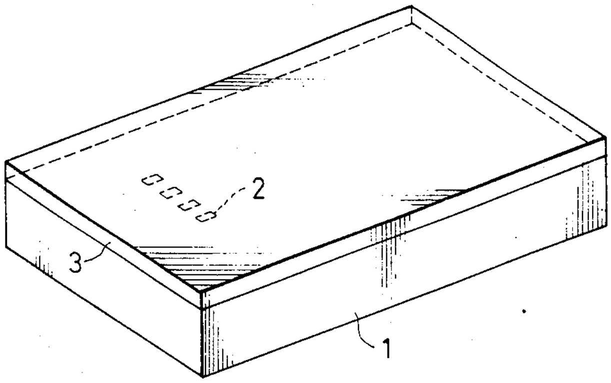
Figure 3:
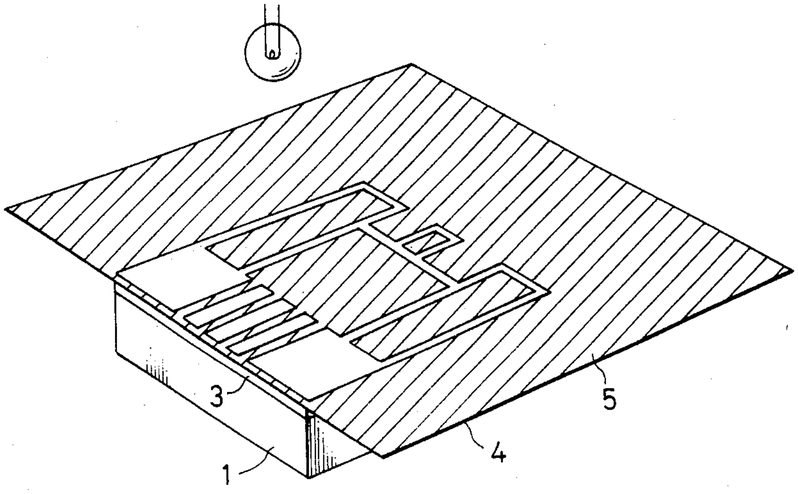

After the surface of the substrate 1 on which an energy generating element 2 is provided is cleaned and dried, a dry photoresist film 3 (thickness of 25 to 100 μm), as shown in FIG. 2, is laminated on the entire surface of the substrate at a rate of 0.2 to 4 ft/min and a pressure of 1 to 3 $kg/cm^2$ while the dry photoresist film 3 is heated at a temperature of 80° C. to 150° C. In this case, the dry photoresist film 3 is brought into tight contact with the surface of the substrate and is bonded thereto. Subsequently, as shown in FIG. 3, a photomask 4 having a predetermined pattern 5 is placed on the dry photoresist film 3 bonded to the surface of the substrate 1, and the photoresist film 3 is then exposed through the photomask 4. It should be noted that the pattern 5 corresponds to regions for an intermediate liquid chamber, an ink channel, an orifice and positioning guides for aligning the side and rear wall members of the intermediate liquid chamber. The pattern 5 does not transmit light therethrough. Therefore, the portion of the dry photoresist film which is covered by the pattern 5 is not exposed to radiation, and is left uncured. In this case, the alignment between the energy generating elements 2 and the pattern 5 must have been performed by a well-known method. In other words, the energy generating elements 2 must be aligned with the ink channel to be formed thereafter.

Figure 4:
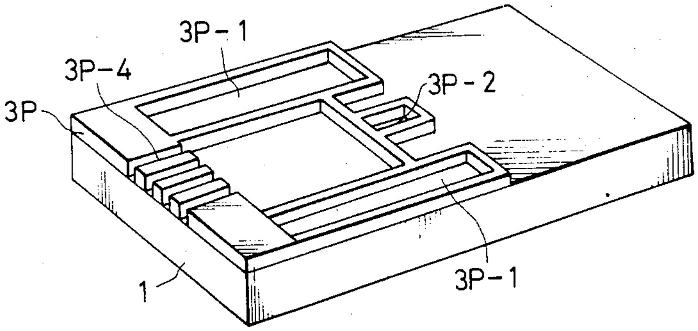

After the exposure operation, the dry photoresist film is dipped in trichloroethane so that the non-polymerized photoresist portion is dissolved and removed from the substrate. As a result, in a cured photoresist film 3P, concaved portions, as shown in FIG. 4, are formed on the basis of the pattern 5. The cured photoresist film 3P left on the substrate 1 is then further cured to improve the durability thereof. For this purpose, the cured photoresist film 3P is subjected to thermal polymerization at a temperature of 130° C. to 160° C. for 10 to 60 minutes, or to ultraviolet radiation, or to a combination thereof.

Figure 5:
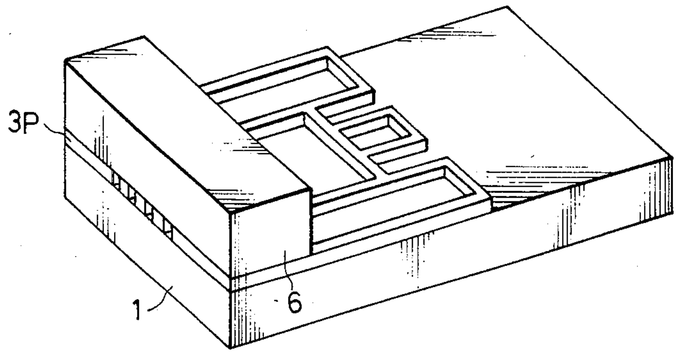
Figure 6:
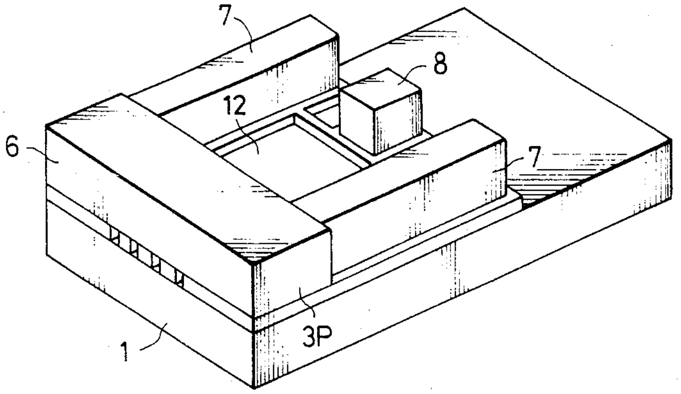

The cured photoresist film 3P integrally has an ink channel 3P-4, two positioning guides 3P-1 for aligning respective side wall members of the intermediate liquid chamber with the substrate 1, and an positioning guide 3P-2 for aligning a rear wall member of the intermediate liquid chamber with the substrate 1. Subsequently, a channel cover 6 for forming part of the ink channel 3P-4 and the front wall of the intermediate liquid chamber 12 is adhered to the upper surface of the portion of the cured photoresist film 3P which defines the ink channel 3P-4, as shown in FIG. 5. In particular, an epoxy-type adhesive is spin-coated on a glass plate to a thickness of 3 to 4 $\mu$m and is pre-heated to be converted to the B stage. This is adhered to the portion of the cured photoresist film 3P described above, and the adhesive is actually cured.

Figure 7:
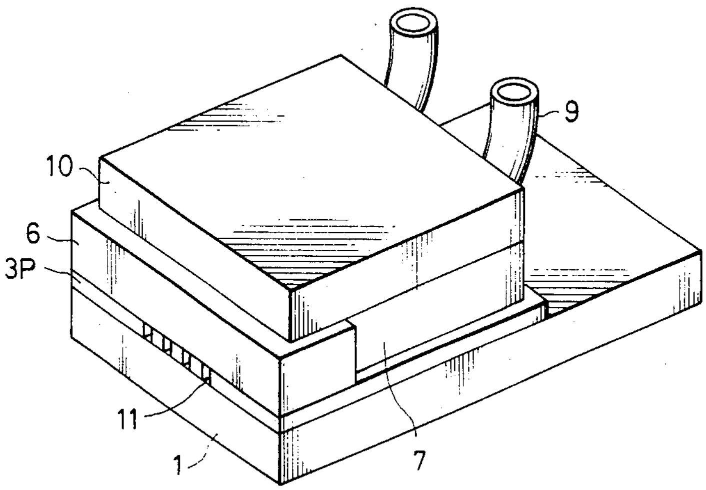

Side wall members 7 and a rear wall member 8 of the intermediate liquid chamber are fitted in the positioning guides 3P-1 and 3P-2 of the hardened photoresist film 3P through an adhesive layer. The members 7 and 8 comprise glass, ceramic or plastic. As shown in FIG. 7, ink supply pipes 9 are installed, and a cover 10 as a ceiling of the intermediate liquid chamber 12 is adhered to the members, thus realizing an ink jet recording head.

In the embodiment described with reference to the accompanying drawings, the region which has the ink channel formed on the substrate of the recording head and the positioning guides for fixing together the substrate and the members defining the intermediate liquid chamber, is integrally formed as one member of the cured photoresist film. However, the present invention is not limited to the above construction. For example, the member defining the ink channel need not be integrally formed with the positioning guides. In addition, the member defining the ink channel need not have the same height as the positioning guide members. However, the ink channel member and positioning guide members preferably have the same height when the photoresist film or the like is patterned so as to form them.

In the above embodiment, the side and rear positioning guides have a shape such as to surround the entire periphery of the side and rear wall members, respectively. However, when the side and rear members are properly positioned, each positioning guide need not surround the entire periphery of the corresponding member.

In the ink jet recording head described in detail according to the present invention, unlike in the conventional method, jigs for forming side and rear walls of the intermediate liquid chamber need not be used to form the intermediate liquid chamber. The member comprising the printing head can be aligned by using photolithographic techniques. In addition, the positioning guides which are used to properly adhere such constituting members of the ink jet recording head to the substrate prevent the adhesive from flowing into the ink channel. The adhesion of the constituting members, which conventionally requires great skill, can thus be simplified. Therefore, the ink jet recording head according to the present invention can be manufactured on a mass production line with high precision and high reliability at a high yield.

What we claim is:

1. An ink jet recording head comprising:

a substrate;

an orifice for discharging an ink droplet therethrough;

an energy generating element on said substrate for generating energy to discharge the ink droplet;

an ink supply area on said substrate in communicating with said orifice for supplying ink to said energy generating element;

an ink tank provided for supplying ink to said ink supply area, said ink tank being formed by wall members mounted on said substrate; and a position guide of a cured film of photosensitive resin provided on said substrate by utilizing a photoresist layer, said position guide having ridges for cooperating with said wall members to align said ink tank at a predetermined position on said substrate.

2. An ink jet recording head according to claim 1, wherein said position guide is integrally formed with a member defining said ink supply area.

3. An ink jet recording head according to claim 1, wherein said position guide is made of the same material as a member defining said ink supply area.

4. An ink jet recording head according to claim 1, wherein said position guide has the same height as a member defining said ink supply area.

5. An ink jet recording head according to claim 1, wherein said position guide is formed in the same step in which said ink supply area is formed.

6. An ink jet recording head according to claim 1, wherein said ink supply area and said position guide are simultaneously formed.

* * * * *

UNITED STATES PATENT AND TRADEMARK OFFICE

CERTIFICATE OF CORRECTION

PATENT NO. : 4,570,167

DATED : February 11, 1986

INVENTOR(S) : HIROSHI SUGITANI, ET AL.

It is certified that error appears in the above-identified patent and that said Letters Patent is hereby corrected as shown below:

Column 1, line 19, change "known a method" to --known method--;
line 26, change "channel high" to --channel with high--; and
line 68, delete "the".

Column 2, line 33, change "detail, FIGS." to --detail. FIGS.--.

Column 3, line 12, change "concaved" to --concave--.

Column 4, line 14, change "member" to --members--; and
line 33, change "communicating" to --communication--.

Signed and Sealed this

*Twenty-third* Day of *September 1986*

[SEAL]

*Attest:*

DONALD J. QUIGG

*Attesting Officer* *Commissioner of Patents and Trademarks*